(12) United States Patent
Yoshida et al.

(10) Patent No.: US 7,900,331 B2
(45) Date of Patent: Mar. 8, 2011

(54) WORK ASSEMBLING DEVICE AND ASSEMBLING METHOD

(75) Inventors: Takashi Yoshida, Sayama (JP); Muneki Yamada, Sayama (JP); Tetsuo Ishii, Sayama (JP); Takaji Mukumoto, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 1252 days.

(21) Appl. No.: 10/597,686

(22) PCT Filed: Nov. 2, 2004

(86) PCT No.: PCT/JP2004/016251
§ 371 (c)(1),
(2), (4) Date: Aug. 3, 2006

(87) PCT Pub. No.: WO2005/075144
PCT Pub. Date: Aug. 18, 2005

(65) Prior Publication Data
US 2007/0169331 A1    Jul. 26, 2007

(30) Foreign Application Priority Data

Feb. 3, 2004  (JP) ................. 2004-026212
Feb. 3, 2004  (JP) ................. 2004-026213
Feb. 3, 2004  (JP) ................. 2004-026214

(51) Int. Cl.
*B23Q 7/00*  (2006.01)
*G01M 19/00*  (2006.01)

(52) U.S. Cl. ........... 29/407.09; 29/464; 29/465; 29/468; 29/525.01; 29/559; 29/712; 29/714

(58) Field of Classification Search ........... 29/407.09, 29/464, 465, 468, 525.01, 559, 712, 714
See application file for complete search history.

(56) References Cited

U.S. PATENT DOCUMENTS 4,887,341 A * 12/1989 Sakimori et al. ........... 29/888.01

FOREIGN PATENT DOCUMENTS

| JP | 53-160098 | 12/1978 |
|---|---|---|
| JP | 55-124383 | 9/1980 |
| JP | 60161038 A * | 8/1985 |
| JP | 63-062622 | 3/1988 |
| JP | 01-228741 | 9/1989 |
| JP | 03-239684 | 10/1991 |
| JP | 04-250931 | 9/1992 |
| JP | 06-000724 | 1/1994 |
| JP | 08-252783 | 10/1996 |
| JP | 10-006149 | 1/1998 |
| JP | 10-235577 | 9/1998 |
| JP | 10-265015 | 10/1998 |
| JP | 2000-158242 | 6/2000 |
| JP | 2001-198741 | 7/2001 |
| JP | 2002-254254 | 9/2002 |

* cited by examiner

*Primary Examiner* — C. J Arbes
(74) *Attorney, Agent, or Firm* — Ranklin, Hill & Clark LLP

(57) ABSTRACT

A work (W) with a part assembling surface on many faces is rotated by a work holding jig (10) so as to sequentially convert each of the part assembling surfaces to the upward horizontal attitude, a bolt is fastened from above vertically while gripping an assembly part (B) by a part gripping device (12), and this is repeated so that an assembling operation can be carried out smoothly and an assembly space can be saved.

9 Claims, 8 Drawing Sheets

(a)

(b)

(c)

(a)

(b)

(c)

(a)

(b)

_US 7,900,331 B2_

WORK ASSEMBLING DEVICE AND ASSEMBLING METHOD

TECHNICAL FIELD

The present invention relates to a work assembling device and an assembling method which is convenient in assembling various parts or the like while conveying a work, for example.

BACKGROUND ART

As a conventional device for assembling various assembly parts while conveying a work, for example, such a prior art is known that a auxiliary pallet is provided capable of rotational movement with respect to a pallet body and a work is fixed to this auxiliary pallet and conveyed and after being conveyed to an assembly portion, the auxiliary pallet is inclined by a predetermined angle to be positioned so that the work is changed to a predetermined attitude to facilitate an assembling operation (See Patent Document 1, for example).

Also as a device for supplying and press-fitting a press-fitting part into a press-fitted portion of a work, for example, such a device is known that the press-fitting part is gripped through a work holding portion at a tip end of an arm portion through a floating mechanism and after being supplied to a predetermined supply position by a part feeding device, this part is press fitted by an elevating head (See Patent Document 2, for example).

Moreover, in order to prevent a work from being damaged when a plurality of works are combined for assembling, such a device is known that a first part is gripped by a clamp finger, which is moved by a moving device and a pressure applied to the clamp finger is detected by a pressure detection sensor till the first part is brought into contact with a second part (See Patent Document 3, for example).

Moreover, as an assembly line for assembling an engine for a vehicle, for example, such an assembly line is known that assembly parts are assembled while a work body is made to run along a main line or a sub line (See Patent Document 4, for example).

Also, such a technique is known that an attitude of a work is converted in a work reversing process in the middle of a series of processes for processing and machining the work so that a work load of workers is alleviated and work time is reduced at the same time (See Patent Document 5, for example).

Patent Document 1: Japanese Patent Application Publication No. 10-235577
Patent Document 2: Japanese Patent Application Publication No. 2000-158242
Patent Document 3: Japanese Patent Application Publication No. 2002-254254
Patent Document 4: Japanese Patent Application Publication No. 1-228741
Patent Document 5: Japanese Patent Application Publication No. 10-265015

DISCLOSURE OF THE INVENTION

Problems to be Solved by the Invention

First, the art disclosed in Patent Document 1 has a problem that work efficiency is limited since operations such as inclining the attitude of a work and fixing this attitude all depend on manual work by workers.

On the other hand, if a driving source for changing the attitude and a fixing mechanism are to be provided on the pallet body side, the weight of the pallet body is increased, and since it becomes necessary to provide a driving source for all the pallet bodies, installation costs will be also increased.

Then, the present invention has an object to facilitate operation to assemble various parts or the like in an assembly process while conveying a work provided with an assembling surface on many faces such as an engine for a vehicle, for example, and to constitute equipment simply and inexpensively.

Moreover, in the arts disclosed in Patent Documents 2 and 3, since a work or part to be handled is limited to one type, gripping or positioning of the part is not difficult so much, but when many parts are to be assembled to a work and the assembly is to be done by a single device, the device is complicated and installation costs are increased, which is a problem.

Also, when parts positioning and bolt tightening are to be carried out by separate devices, it also complicates the devices and lowers work efficiency, which is a problem.

Then, the present invention has an object, particularly in assembling many types of assembly parts to a work, to enable efficient operation from positioning to fastening of assembly parts by a single device, to avoid complication of the device and moreover to constitute the device with inexpensive installation costs.

Moreover, in a method for assembling assembly parts while running a main line and a sub line as in Patent Document 4, a flat occupied space is enlarged and the attitude of a work should be changed at each assembling station as necessary, which is a problem in view of efficient work.

Moreover, as in Patent Document 5, even in a method of providing a work reversing process in the middle of a series of processes such as processing or machining, a work having a part assembling surface on many faces requires provision of a plurality of work reversing processes, which has a limitation in terms of space and work efficiency.

Then, the present invention has an object to enable efficient assembling of a work having a part assembling surface on many faces and to save space for assembling.

Means for Solving the Problems

In order to solve the above problems, there is provided a work holding jig for converting each part assembling surface sequentially to an upward horizontal attitude by rotating a work provided with a part assembling surface on many faces, and a part gripping device which is provided at an upper part of this work holding jig and can position an assembly part above the work and fasten a bolt in a vertical direction.

A pair of arms are provided at the part gripping device, and a claw which can support a bottom face of the assembly part and a fastening tool which can fasten the bolt are provided at a tip end of each of the arms.

And by supporting the bottom face of both side ends of the assembly part with the pair of claws at the tip end of the arms, for example, the part can be supported stably. And when the assembly part is positioned at a predetermined position, by fastening the bolt by the fastening tool, efficient assembly operation can be realized.

Moreover, a part assembling surface of the work is sequentially converted to an upward horizontal attitude by a work holding member, and from above that, the assembly part is assembled by fastening the bolt vertically. In this way, a force of gravity can be used, which eliminates concerns such as inclination of the assembly parts or falling down of the bolt, and assembling operation can be carried out smoothly. Also, a gripping mechanism or the like of the part gripping device can be constituted simply.

Also, when positioning an assembly part above the part assembling surface, a bolt is inserted into at least one bolt insertion hole in advance, and a socket of a fastening tool is fitted with this bolt head for positioning.

When positioning is made by fitting the socket in the bolt head in this way, a positioning means can be constituted simply, and the operation can be moved to fastening immediately after positioning, which is efficient.

When there are plural bolt insertion holes in an assembly part, it is only necessary to insert a bolt into at least one bolt insertion hole.

Also, the socket to be fitted in the bolt head may be provided with a part of function of a gripping mechanism for gripping the assembly part, as necessary. In this case, a bottom face of the assembly part is supported by a claw on one side, and the assembly part is gripped by the claw and the socket by fitting the socket in the bolt head.

Furthermore, in a work assembling device having a substantially L-shaped work holding jig for holding a work provided with a part assembling surface on many faces, the holding jig is made detachably attachable with respect to a column provided with a driving portion, a holding portion for holding the work and a part of a first rotating mechanism for rotating this holding portion are provided on one face of substantially the L-shape, while a connecting mechanism for connecting to the column and a second rotating mechanism for rotating the work holding jig are provided outside of the other face of substantially the L-shape, so that an attitude of the work is converted by driving the driving portion while the work holding jig is connected to the column and all the part assembling surfaces are held in the upward horizontal state by combination of rotation of the holding portion and rotation of the work holding jig.

By separately constituting the work holding jig for holding the work and the driving portion for converting the attitude of the work in this way, and by conveying the work by the work holding jig and connecting the work holding jig to the column at a location where a part is to be assembled so that the attitude of the work is converted by the driving portion, for example, there is no such nonconformity that the weight of a conveying jig (work holding jig) is increased but equipment can be constituted simply and installation costs can be lowered.

Moreover, when changing the attitude of the work, if all the part assembling surfaces are brought into the upward horizontal state and all the assembly parts are assembled from above, the attitude of a connecting bolt stays in the perpendicular attitude all the time, which enables easy assembly in a stable state.

When connecting the work holding jig to the column, it is necessary to employ a mechanism which can transmit a torque of the driving portion to the holding portion and the work holding jig through a first and a second rotating mechanisms, and an output shaft of the driving portion and an input shaft of the work holding jig are made connectable by key fitting or gear engagement, for example.

A notch hole is formed in the holding portion.

And by assembling parts on a holding surface side of the work through this notch hole, parts can be assembled from above all the time even if a part mounting surface is located on the holding surface side of the work.

A worm gear to be meshed with a gear on the holding portion side is provided as a first rotating mechanism for rotating the holding portion.

By providing a worm gear to be meshed with a gear on the holding portion side as the first rotating mechanism in this way, even if a work is rotated during conveyance or the like, for example, phase shifting of key fitting between an input shaft of the work holding jig and an output shaft of the driving portion hardly occurs and connection is not hindered.

Moreover, in a work assembling device having a gripping device for a assembly part to be positioned at a predetermined assembly position while a bolt is inserted into a bolt insertion hole of the assembly part when assembling the assembly part, a claw which can support a bottom face of the assembly part, a socket which can be freely fitted in a bolt head to be inserted into the bolt insertion hole, a nut runner for rotating this socket, and a position detecting means for detecting a position of the socket are provided and the assembly part is gripped and positioned by supporting the bottom face of the assembly part with the claw and by fitting the socket in the bolt head at the same time.

And in positioning the assembly part at a predetermined assembly position of a work, the attitude is controlled so that the assembly surface of a work body is in the upward horizontal attitude, for example, and by positioning and assembling the assembly part in this state, assembling operation can be carried out stably and easily.

At this time, while the bolt is inserted in the bolt insertion hole of the assembly part, by supporting the bottom face of this assembly part by the claw at a predetermined spot and by fitting the socket in the bolt head and for gripping, the gripping mechanism of the assembly part is constituted simply and positioning can be facilitated by the position detecting means of the socket. And since the operation can be moved to bolt fastening upon completion of positioning, efficiency of a series of operations can be improved.

Here, the number of claws is optional, and it may be one depending on the shape or the like of the assembly part, but if they are provided in plural, most of the assembly parts can be stably gripped irrespective of the shape or size or the like of the assembly part, which improves versatility.

Also, if there are plural bolt insertion holes in an assembly part, it is not necessary to insert the bolt in all the bolt insertion holes but is it only necessary to insert the bolt at least into one bolt insertion hole.

The claw is made capable of proximity/detachment with respect to the socket.

By constituting the claw capable of proximity/detachment with respect to the socket in this way, the assembly part can be positioned at a predetermined position and the claw can be removed in the middle of bolt fastening, for example, and that can be applied to a case where there is no gap between the bottom face of the assembly part and an upper face of the work body.

The claw is provided in a pair capable of adjustment of an interval between them.

By providing a pair of claws in this way, the bottom face of the assembly part can be supported at two spots and even if the size or the like of the assembly part is increased or the shape is different, stable gripping is realized.

Advantages of the Invention

With the work holding jig according to the present invention, assembling operation to assemble various parts or the like in an assembling process while conveying a work provided with a part assembling surface on many faces such as an engine for a vehicle, for example, is facilitated, assembling equipment can be constituted simply and inexpensively, and at assembling, the assembling surface of the work can be converted by the work holding jig to the upward horizontal attitude all the time and the assembly parts can be assembled from above vertically.

By sequentially converting the part assembling surface of the work by the work holding member to the upward horizontal attitude and by assembling the assembly part through fastening the bolt from above in the vertical direction, a force of gravity can be used and there is no need to worry about inclination of the assembly part or falling down of the bolt or the like, which enables smooth assembling work and simple constitution of the gripping mechanism or the like of the part gripping device.

And as the part gripping device, by providing a claw which can support the bottom face of the assembly part at the tip ends of the pair of arms and a fastening tool which can fasten the bolt, the assembly part can be supported in a stable state and efficient assembling operation can be realized.

Also, when positioning the assembly part above the part assembling surface, by inserting the bolt into at least one bolt insertion hole and fitting the socket, which is the fastening tool, in this bolt head for positioning, the positioning means can be constituted simply and the subsequent operation can be carried out efficiently.

The work holding jig substantially in the L-shape for holding the work provided with a part assembling surface on many faces is so constituted that it is made detachably attachable with respect to the column provided with the driving portion and when the driving portion is driven in the state where the both are connected to each other, the attitude of the work is converted and the respective part assembling surfaces are held in the upward horizontal state. Thus, the work holding jig can be constituted simply and inexpensively, and by assembling while converting the part assembling surface to the upward horizontal state, the assembling operation is facilitated and parts can be assembled in the stable state.

And by forming the notch hole in the holding portion for fixing the work, even if the part assembling surface is located on a fixing surface side of the work, part can be assembled without omission.

Also, by providing the worm gear to be meshed with the gear on the holding portion side as the first rotating mechanism for rotating the holding portion, even if the work is rotated during conveyance or the like, for example, phase shifting of key fitting or the like between the input shaft of the work holding jig and the output shaft in the driving portion hardly occurs and connection is made smoothly.

When assembling the assembly part of the work body, the bolt is inserted into the bolt insertion hole in advance, the bottom face of the assembly part is supported by the claw, the socket is fitted in the bolt head for gripping, and the position of this socket is detected by the position detecting means. Then, gripping and positioning of the assembly part is carried out at the same time, which enables constitution of the gripping mechanism and the positioning mechanism simple and improves efficiency of a series of operations from positioning to assembly.

At this time, by making the claw capable of proximity/detachment with respect to the socket, application is made possible even if there is no gap between the bottom face of the assembly part and the upper face of the work body, for example.

Moreover, by providing a pair of claws and making an interval between them adjustable, the bottom face of the assembly part can be supported stable at two spots.

BEST MODE FOR CARRYING OUT THE INVENTION

Embodiments of the present invention will be described with reference to the accompanying drawings.

Figure 1:
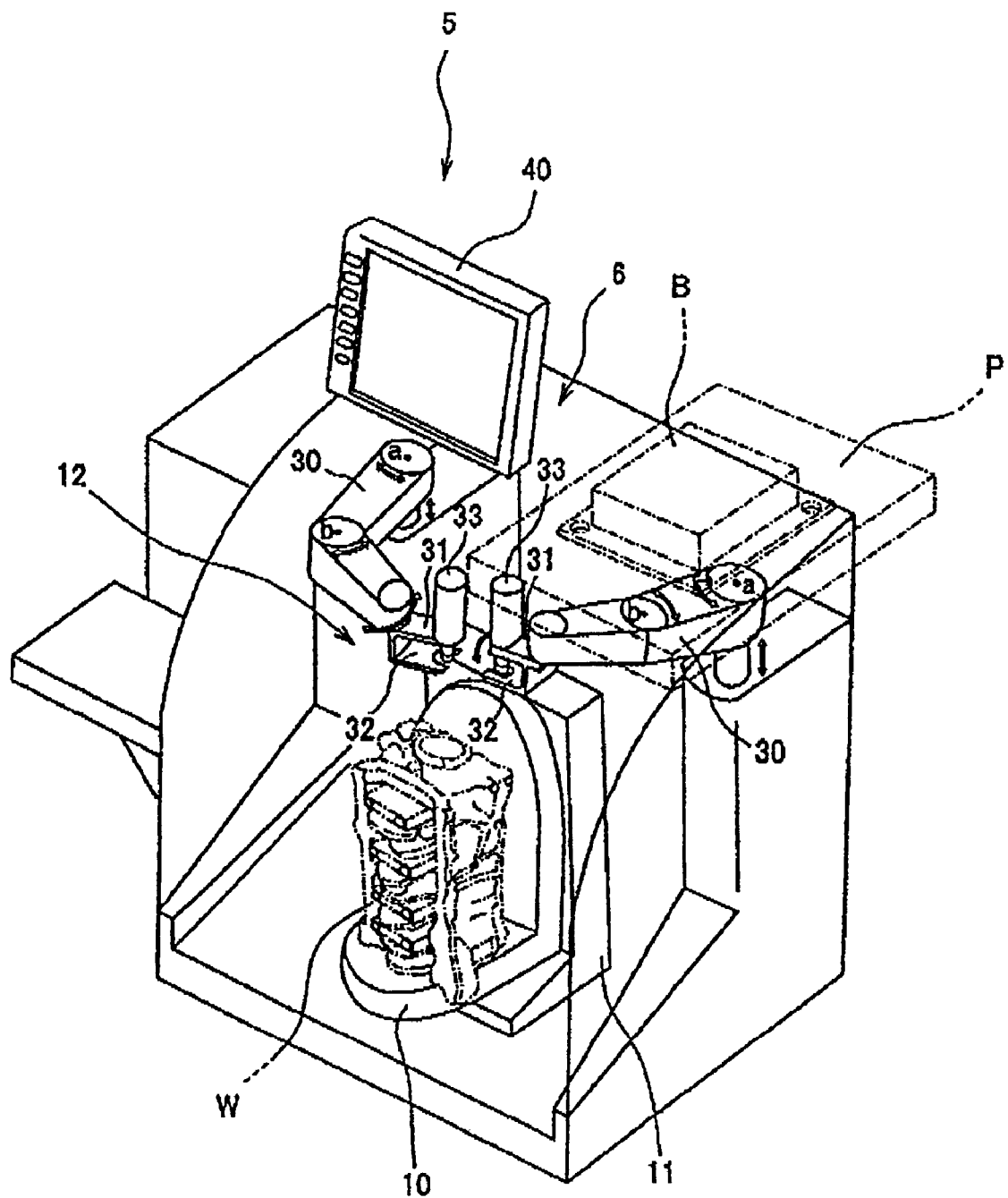
FIG. 1 is a perspective view showing an image of a work assembling device.
Figure 2:
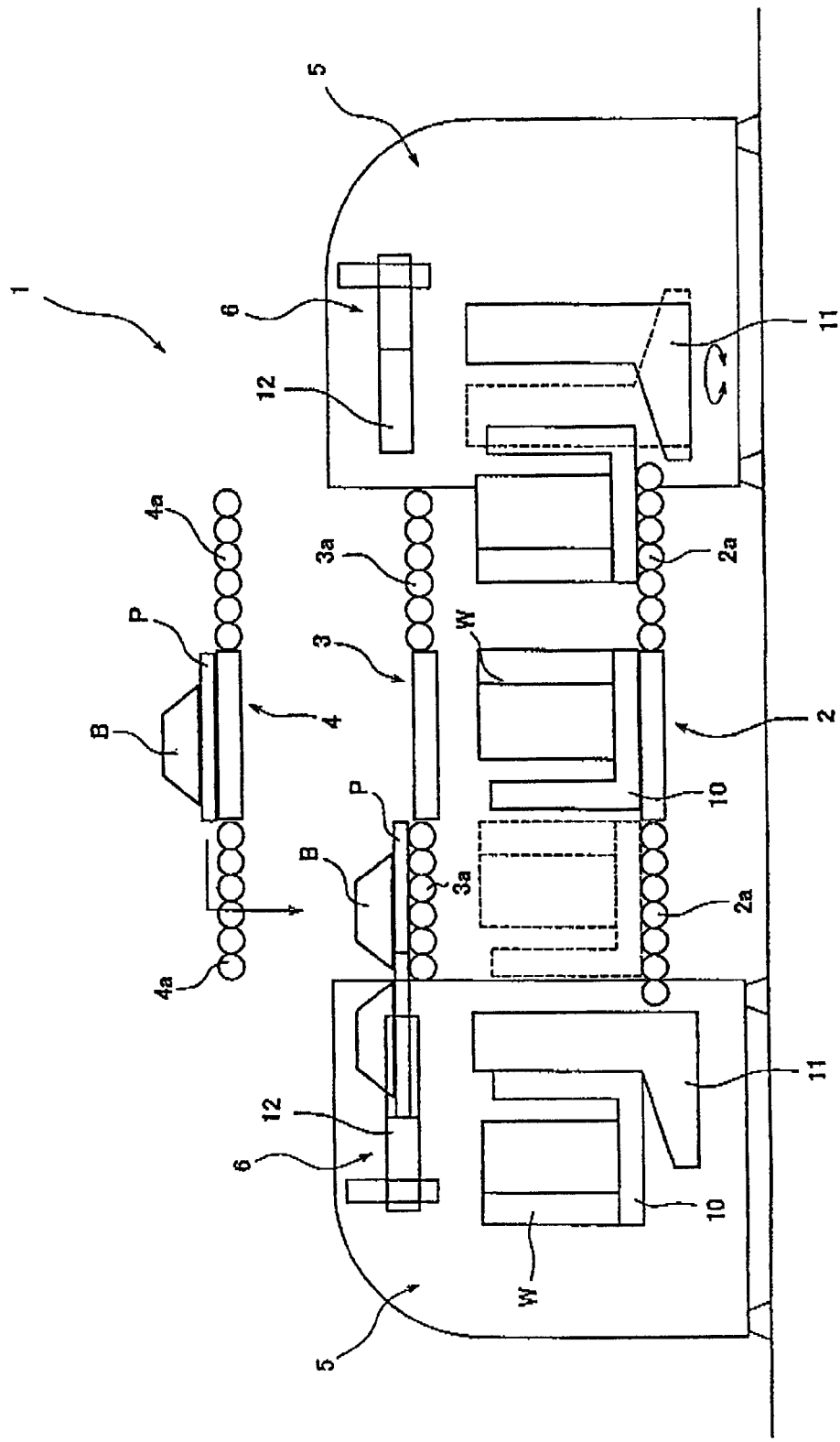
FIG. 2 is a front view of an entire work assembling system.
Figure 3:
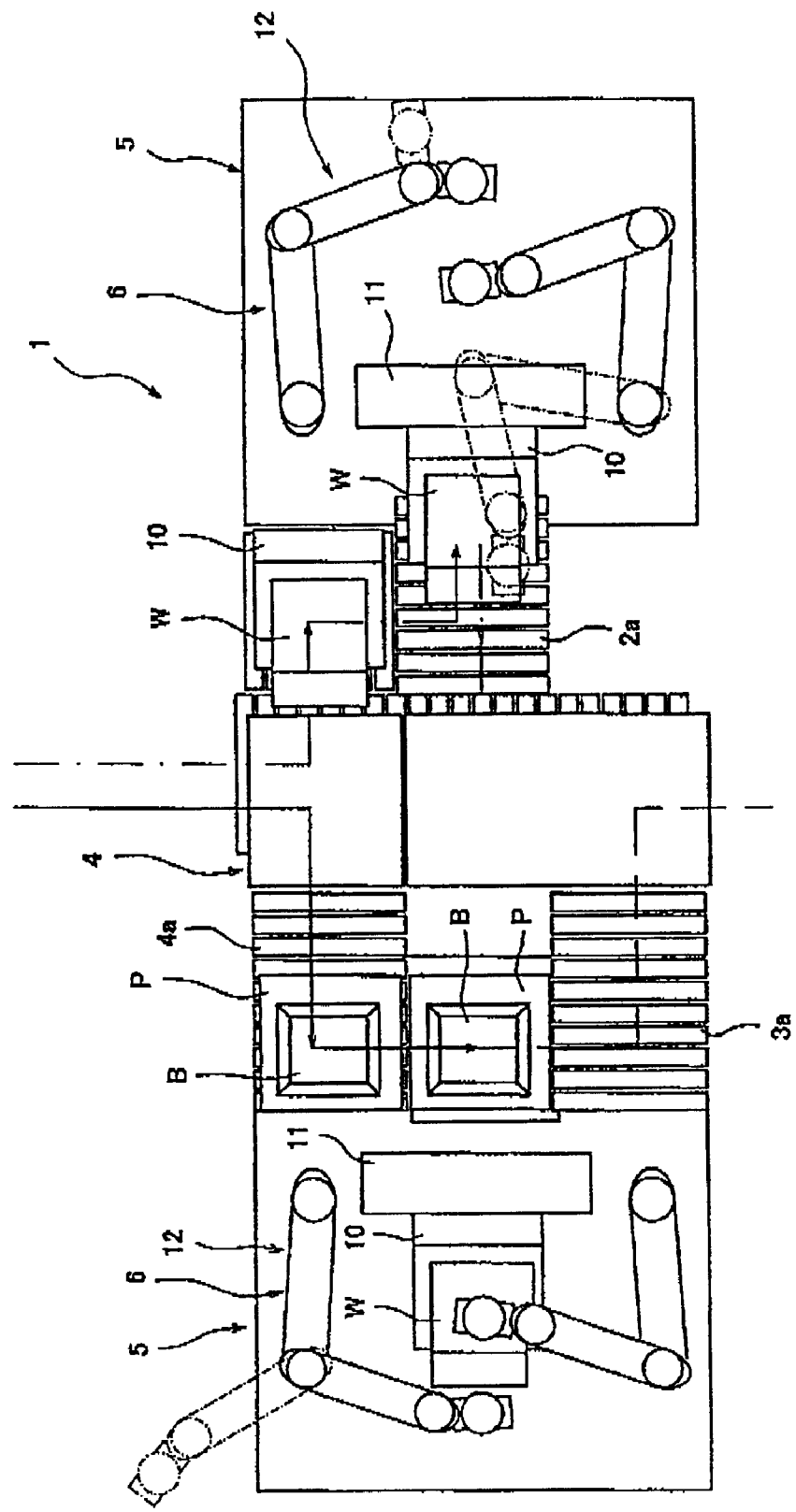
FIG. 3 is a plan view of the work assembling system.
Figure 4:
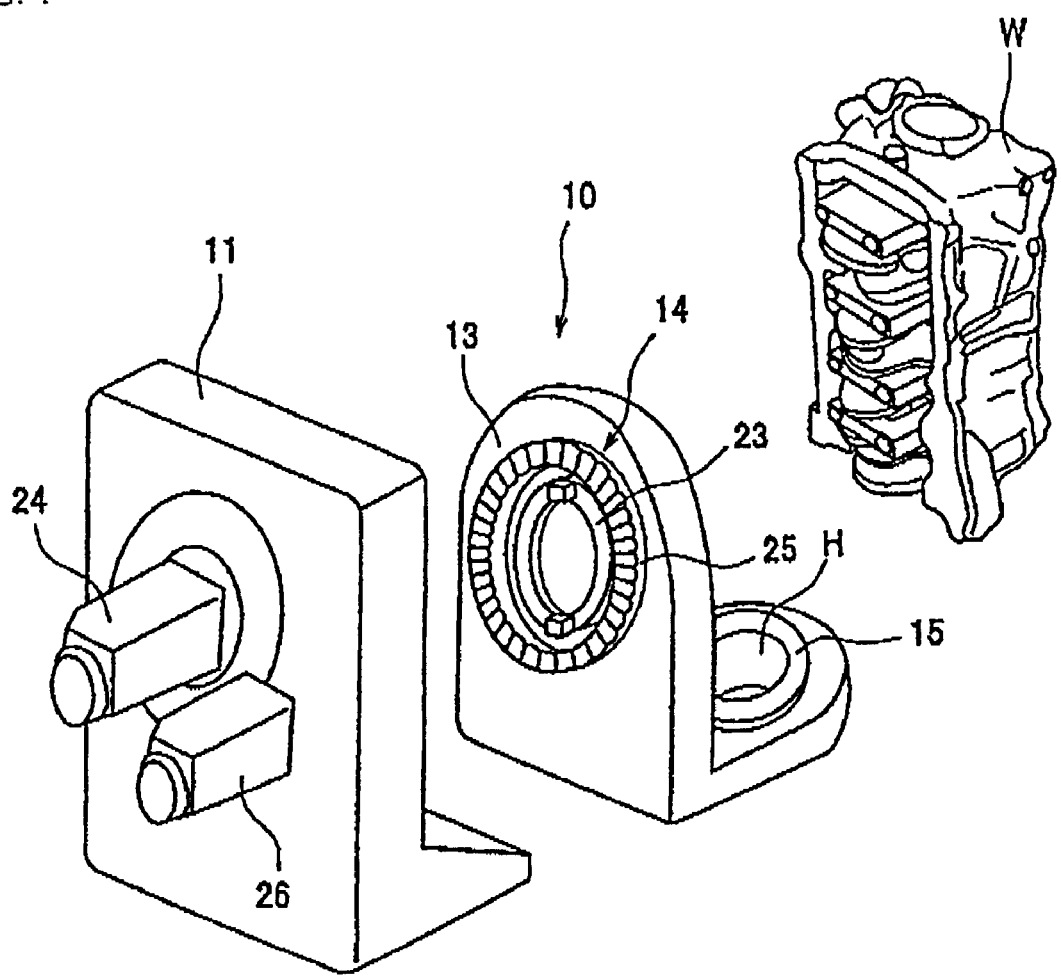
FIG. 4 is an explanatory view of a work holding jig and a column.
Figure 5:
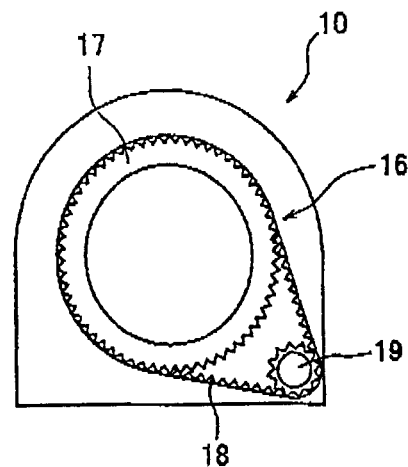
FIG. 5 is an explanatory view of an internal structure of the work holding jig.
Figure 5:
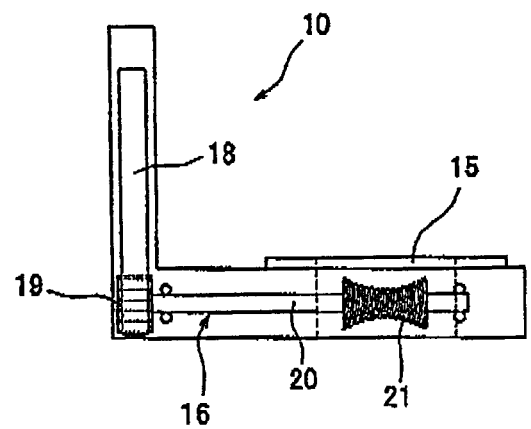
Figure 5:
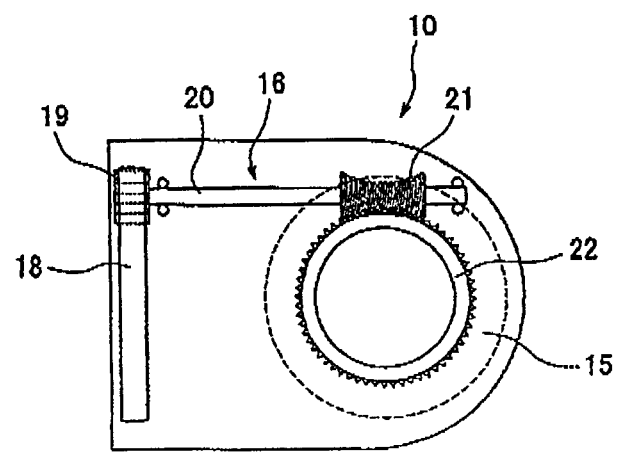
Figure 6:
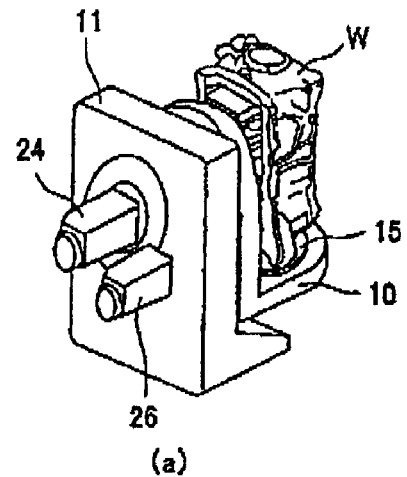
FIG. 6 is an explanatory view showing an example of attitude change of a work by the work holding jig.
Figure 6:
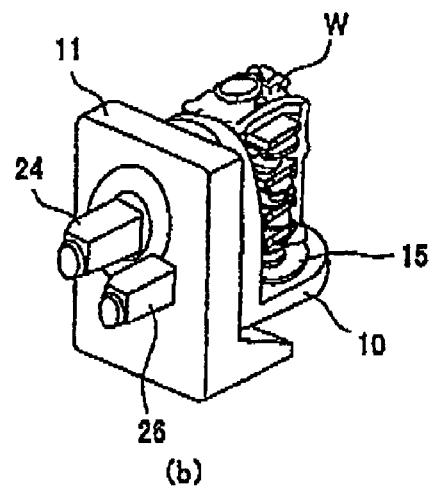
Figure 6:
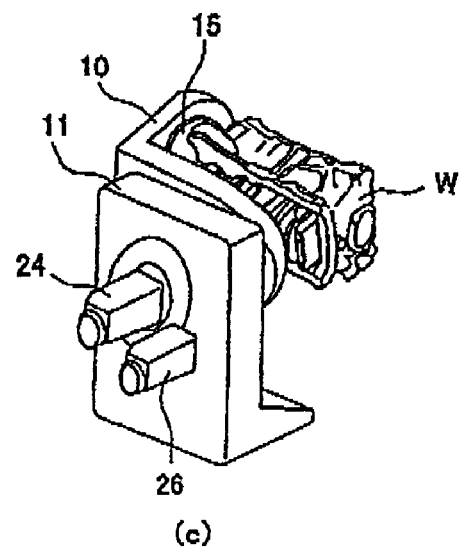
Figure 7:
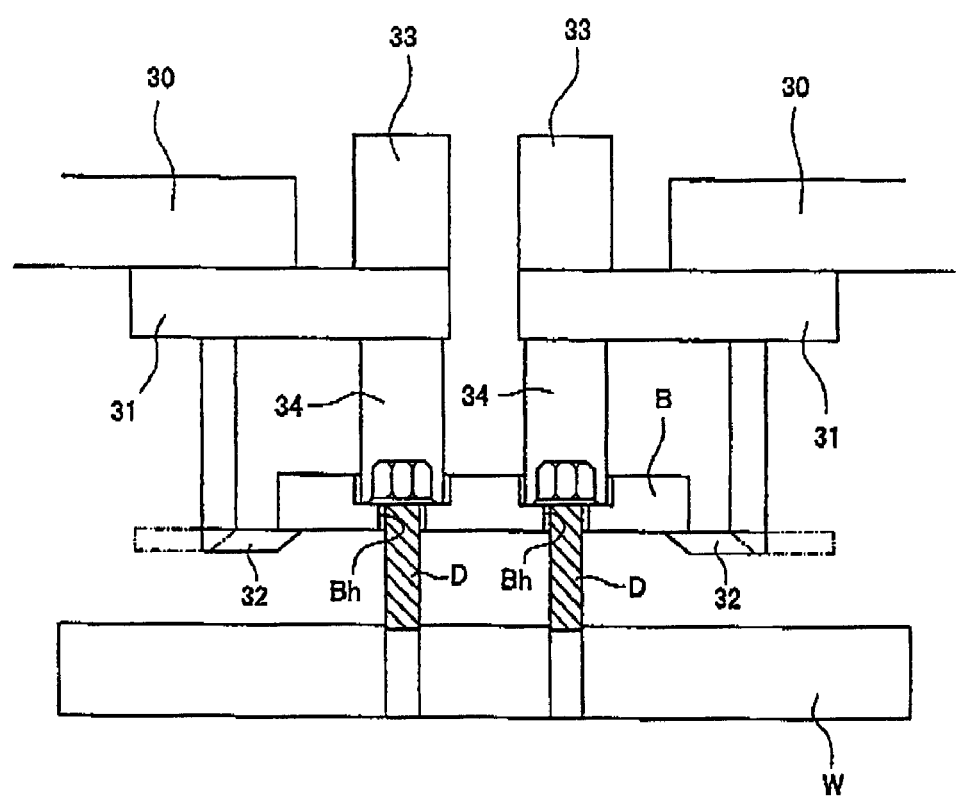
FIG. 7 is an explanatory view of a state where a part is gripped by a part gripping device.
Figure 8:
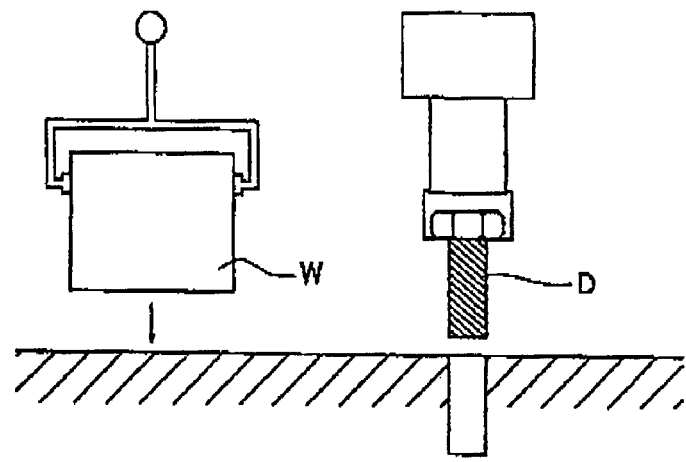
FIG. 8 is an explanatory view showing advantages of vertical assembly.
Figure 8:
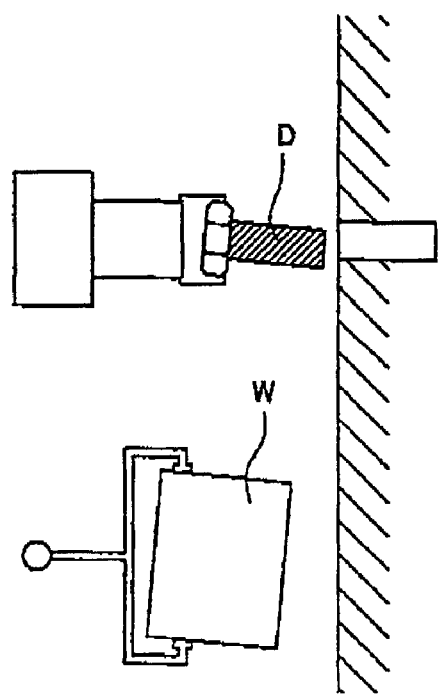

Here, FIG. 1 is a perspective view showing an image of a work assembling device, FIG. 2 is a front view of an entire work assembling system, FIG. 3 is a plan view of the work assembling system, FIG. 4 is an explanatory view of a work holding jig and a column, FIG. 5 is an explanatory view of an internal structure of the work holding jig, FIG. 6 is an explanatory view showing an example of attitude change of a work by the work holding jig, FIG. 7 is an explanatory view of a state where a part is gripped by a part gripping device, and FIG. 8 is an explanatory view showing advantages of vertical assembly.

A work assembling device according to the present invention is constituted so that efficient assembling operation is made possible with respect to a work having a part assembling surface on many faces and a space for assembling can be saved, and the device is applied to assembling equipment in which, after holding a work W having a part assembling surface on many faces with a work holding jig 10, this is conveyed toward a work assembling device 6 of an assembly portion 5 and the attitude of the work W is converted, by which the part assembling surface is sequentially converted to the upward horizontal attitude and all the assembly parts B gripped by a part gripping device 12 from above can be assembled from above. In a preferred embodiment, the device is applied to assembling equipment for a vehicle engine.

Prior to description of the work assembling device 6 according to the present invention, outline of an entire constitution of the work assembling system will be explained based on FIGS. 2 and 3.

A work assembling system 1 for assembling a vehicle engine comprises, as shown in FIG. 2, a work conveyer 2 for conveying the work W in which a cylinder block and a cylinder head are combined, an empty pallet dispensing conveyer 3 for dispensing/conveying an empty pallet P, and a part conveyer 4 for conveying an assembly part B on the pallet P in three stages upward from a lower layer, and a pair of assembling portions 5 are provided at both ends of each conveyer, and in this assembling portion 5, a work assembling device 6 as also shown in FIG. 1 is disposed.

And the work W is conveyed on the work conveyer 2 while being held by a work holding jig 10, and this work W is provided with a part assembling surface on peripheral six faces or more.

And on the work assembling device 6 of the assembling portion 5, a column 11 capable of connection with the work holding jig 10 is disposed, and this column 11 is constituted capable of changing its orientation by rotation around a perpendicular shaft by a reversing mechanism, and a gripping device 12 for assembly part provided with a pair of arms for gripping the assembly part B is provided above this column 11.

And between the assembling portion 5 and the work conveyer 2, as shown also in FIG. 3, plural rows of transfer paths 2a are provided in the longitudinal direction, plural rows of transfer paths 3a are also provided in the longitudinal direction between the assembling portion 5 and the pallet dispensing conveyer 3, and plural rows of transfer paths 4a are also provided in the longitudinal direction between the assembling portion 5 and the part conveyer 4. And an elevating mechanism, not shown, is provided between the transfer paths 4a, 3a on the upstream side of conveyance among the transfer paths 4a on an uppermost stage and the transfer paths 3a on a middle stage. And when the assembly part B on the pallet P is conveyed through the part conveyer 4 and transferred to the transfer path 4a on the upstream side of the conveying path, the pallet P is lowered by the elevating mechanism toward the transfer path 3a on the middle stage, the assembly part B is passed to the part gripping device 12 and then, the empty pallet P is fed out to the empty pallet dispensing conveyer 3 (flow diagrams in the left of FIGS. 2 and 3).

On the other hand, when the work W held by the work holding jig 10 is conveyed on the work conveyer 2 and transferred to the work assembling device 6 at the assembling portion 5 via the transfer path 2a, the work holding jig 10 is connected to the column 11 (See the flow diagram in the right of FIG. 3), and the column 11 to which the work holding jig 10 is connected is rotated by 180 degrees and changes its orientation (See state diagrams in the left of FIGS. 2 and 3) so that the work W can be placed below the part gripping device 12.

Then, details of constructions of the work holding jig 10 and the column 11 will be described based on FIGS. 4 to 6.

The work holding jig 10 is provided with a jig body 13 substantially in the L-shape, a connection mechanism 14 to be connected to the column 11 is provided outside on the perpendicular surface side of this jig body 13, while a holding portion 15 for holding the work W is provided inside on the other surface side, and an automatic damper (not shown) for automatically clamping the work W is provided at this holding portion 15.

And inside this jig body 13, a first rotating mechanism 16 for rotating the holding portion 15 is provided, and this first rotating mechanism 16 is provided with, as shown in FIG. 5, a driven gear 19 to which rotation is transmitted from an input gear 17 through a transmission belt 18, a worm gear 21 provided at a shaft 20 integral with this driven gear 19, and a wheel gear 22 to be meshed with this worm gear 21, and this wheel gear 22 is provided integrally with the holding portion 15.

And the input gear 17 is rotated integrally with a key fitting portion 23 (FIG. 4), which is a part of the connection mechanism 14, and this key fitting portion 23 is, as will be described later, capable of key fitting to an output shaft of a first driving motor 24 to be attached to the column 11.

The connection mechanism 14 is provided with a gear mesh portion 25 (FIG. 4) as a second rotating mechanism to be fixed to the jig body 13 other than the above-mentioned key fitting portion 23, and this gear mesh portion 25 is capable of being meshed with a gear (not shown) of an output shaft of a second driving motor 26 to be attached to the column 11.

Therefore, after the work holding jig 10 is connected to the column 11 through the connection mechanism 14, when the second driving motor 26 is driven, the jig body 13 of the work holding jig 10 is rotated around a horizontal shaft through the gear mesh portion 25, while when the first driving motor 24 is driven, the holding portion 15 is rotated around a perpendicular shaft with respect to the rotating direction of the jig body 13 through the first rotating mechanism 16, which enables setting of all the faces of the work W in the upward horizontal attitude. An example of the attitude change is as shown in FIG. 6. That is, FIG. 6(a) is a state where the work W is set on the holding portion 15 and automatically clamped, and a state where the holding portion 15 is rotated by 90 degrees by the first driving motor 24 from this state is as shown in FIG. 6(b), and a state where the work holding jig 10 is rotated by 90 degrees by the second driving motor 26 is as shown in FIG. 6(c).

And while converting the assembling surface of the work W to the upward horizontal attitude, the assembly part B gripped by the part gripping device 12 is assembled from above. At this time, a clamp face side of the work W automatically clamped by the holding portion 15 can not be assembled due to existence of the holding portion 15 even if it is set in the upward horizontal attitude. Therefore, a notch hole H is formed at a spot corresponding to the part assembling portion in the holding portion 15, as shown FIG. 4, so that the assembly part B is assembled through this notch hole H.

Next, details of construction of the part gripping device 12 of the work assembling device 6 will be described based on FIGS. 1 and 7.

The part gripping device 12 is, as also shown in FIG. 1, provided with a pair of horizontal joint type stationary arms 30, and these arms 30 are capable of vertical movement and rotational movement within a horizontal face with a shoulder portion a and an elbow portion b, and moreover, wrist oscillating members 31 are also capable of rotational movement within a horizontal face.

And below these oscillating members 31, claws 32 for supporting a bottom face of the assembly part B are mounted, and at the tip ends of the oscillating members 31, nut runners 33 as fastening tools are mounted. And sockets 34 (FIG. 7) are provided at tip ends of rotary shafts extending downward from these nut runners 33, and these sockets 34 are provided with position detecting means, not shown.

Also, the claw 32 is made capable of proximity/detachment with respect to the socket 34 by a driving source, not shown.

And when the assembly part B is to be gripped by this part gripping device 12, as shown in FIG. 7, a fastening bolt D is inserted into a bolt insertion hole Bh of the assembly part B, and if the assembly part B is large, the bottom face at both ends of the part B is supported by the claws 32 of the respective arms 30, and by moving the assembly part B with the socket 34 fitted in the bolt D head portion to a predetermined fastening spot, gripping and positioning to a predetermined spot of the part B can be carried out at the same time.

Action or the like of the work assembling device 6 as above will be described.

As shown in FIG. 2, when the work W held by the work holding jig 10 is conveyed on the work conveyer 2 and transferred toward the assembling portion 5 through the transfer path 2a, the work holding jig 10 is connected to the column 11 through the connection mechanism 14. At this time, even if the attitude of the work W is changed by vibration or the like during conveyance and the wheel gear 22 (FIG. 5) is rotated with the work W and its phase is shifted, the wheel gear 22 is meshed with the worm gear 21 and connected to the key fitting portion 23 through this worm gear 21, the phase of the key fitting portion 23 is hardly shifted and there is no nonconformity to disturb connection.

And when the work holding jig 10 is connected to the column 11, the column 11 is reversed by 180 degrees by a reversing mechanism and positions the work W below the part gripping device 12 and then, sets a desired part assembling surface of the work W in the upward horizontal attitude by driving the first and the second driving motors 24, 26.

On the other hand, the assembly part B is loaded on a pallet P and conveyed on the part conveyer 4 and when it is transferred to the transfer path 4a on the upstream side of the conveying path, it is transferred to the transfer path 3a in the middle stage by the elevating mechanism. Then, when the part gripping device 12 grips the assembly part B, the empty pallet P is dispensed toward the empty pallet dispensing conveyer 3, and the part gripping device 12 gripping the assembly part B positions the assembly part B at a predetermined spot on the assembling surface of the work W in the upward horizontal attitude.

At this time, since the socket 34 to be fitted with the bolt D head portion is provided with the position detecting means, positioning of the assembly part B is made easily and when the positioning is completed, the operation can be smoothly transferred to fastening operation of the bolt D, which eliminates loss time.

And fastening of the bolt D is started, and in the stage where the tip end of the bolt D is screwed into a bolt hole, the claw 32 is retreated backward. Therefore, even if there is no gap between the bottom face of the assembly part B and the upper face of the work W into which the claw 32 enters, that does not prevent the subsequent assembling.

And when assembling of the first assembly part B is completed, the next assembly part B is conveyed to the part gripping device 12 with the similar procedure, and when the part gripping device 12 grips this, the first and the second driving motors 24, 26 are driven on the column 11 side below at the same time, and the part assembling surface of the work W is changed. That is, the part assembling surface corresponding to the next assembly part B is set in the upper horizontal attitude and assembled with the similar procedure. And this operation is repeated as necessary, and required assembly parts B are assembled around the work W. Since assembling direction of the assembly parts B and the fastening direction of the fastening bolt are in the perpendicular attitude, the operations are stable and easy.

That is, as shown in FIG. 8(b), if assembling is attempted from lateral direction, the attitude of the work W and the bolt D might be inclined or displaced due to the weight of the work W and the own weight of the bolt D, but if assembled from above as shown in FIG. 8(a), assembling can be accomplished stably and easily.

In this preferred embodiment, as shown in FIG. 1, an assembling aid navigation system 40 which enables operation while visually checking assembling order, model matching, production management information or the like is provided in the vicinity of the work assembling device 6 of the assembling portion 5.

In the above preferred embodiment, an example that the assembly part B is supported by the pair of claws 32 was shown, but depending on the shape, size, etc. of the assembly part B, it may be gripped only by the claw 32 of the arm 30 on one side and the socket 34.

Also, if a large number of bolt insertion holes Bh are provided, it is not necessary to insert the bolt D into all the bolt insertion holes Bh in advance, but the bolt D may be inserted only into one spot.

Moreover, the transmission belt 18 of the first rotating mechanism 16 shown in FIG. 5 may be, for example, a shaft, chain or any other transmission types other than the belt drive.

By assembling parts according to the above procedures, assembling operation can be carried out efficiently for a work provided with a part assembling surface on many faces and moreover, an assembling space can be saved.

The present invention is not limited to the above preferred embodiment. Those having essentially the same construction as the matter described in claims of the present invention and exerting the same working effects fall within the technical scope of the present invention.

For example, type of works or the like is arbitrary.

INDUSTRIAL APPLICABILITY

After a work provided with a part assembling surface on many faces is held by a work holding jig and conveyed and then, the work is rotated at an assembling portion so as to sequentially convert each part assembling surface to the upward horizontal attitude, a part on it is gripped by a part gripping device and assembled by fastening a bolt in the vertical direction from above so that efficient assembling operation is realized and an assembling space can be saved.

The invention claimed is:

1. A work assembling device for assembling an assembly part to a work including at least two faces, each face having a part assembly surface, the device comprising:
   a work holding jig for converting each part assembling surface sequentially to an upward horizontal attitude by selectively rotating the work, the work holding jig having a first portion configured to rotate the work about a first axis and a second portion configured to rotate the work about a second axis;
   a part gripping device provided at an upper part of the work holding jig and configured to position the assembly part above the work and fasten an associated fastener in a vertical direction relative to the upward horizontal attitude to secure the assembly part to one of the part assembly surfaces of the work, the part gripping device including a pair of arms and a claw, the arms and the claw being adapted to support a bottom face of the assembly part; and
   a fastening tool provided at a tip end of at least one of the arms of the part gripping device for fastening the associated fastener.

2. A work assembling method for assembling an assembly part to a work including at least two fades, each face having a part assembly surface, the method comprising steps of:
   providing a work holding jig configured to sequentially converting one of the part assembling surfaces of the work to an upward horizontal attitude by selectively rotating the work about two axes which are perpendicular to each other
   sequentially positioning an assembly part above one of the part assembling surfaces, and
   fastening an associated fastener vertically, by inserting the associated fastener into at least one fastener insertion hole in advance, and a socket of a fastening tool is fitted with the fastener for positioning.

3. A work assembling device for assembling an assembly part to a work including at least two faces, each face having a part assembly surface, the device comprising:
   a substantially L-shaped work holding jig including:
      a holding portion provided on one face of the work holding jig for detachably holding the work,
      a first rotating mechanism for rotating the holding portion, a part of the first rotating mechanism provided the other face of the work holding jig, a second rotating mechanism for rotating the work holding jig, and a connecting mechanism, the connection mechanism and second rotating mechanism provided on the other face of the work holding jig, and a column provided with a driving portion, the column being detachably connected to the work holding jig via the connecting mechanism and, wherein an attitude of the work is converted by driving the driving portion while the work holding jig is connected to the column and all the part assembling surfaces are held in an upward horizontal state by combination of rotation of the holding portion and rotation of the work holding jig.

4. The work assembling device according to claim 3, wherein a notch hole is formed in the holding portion.

5. The work assembling device according to claim 4, wherein the first rotating mechanism includes a worm gear to be meshed with a gear provided on the holding portion for rotating the holding portion.

6. A work assembling device for assembling an assembly part to a work including at least two faces, each face having a part assembly surface, the device comprising:

a gripping device for the assembly part to be positioned at a predetermined assembly position while a bolt is inserted into a bolt insertion hole of the assembly part when assembling the assembly part, wherein the gripping device includes an arm having an oscillating member provided with a claw that can support a bottom face of the assembly part, a fastening tool, and a socket that can be freely fitted on a bolt head of the bolt to be inserted into the bolt insertion hole, the fastening tool rotating the socket, and the socket has a position detecting means for detecting a position of the socket, and wherein the assembly part is gripped and positioned by supporting the bottom face of the assembly part with the claw and by fitting the socket in the bolt head at the same time.

7. The work assembling device according to claim 6, wherein the claw is made capable of proximity/detachment with respect to the socket.

8. The work assembling device having the gripping device for an assembly part according to claim 6, wherein the claw is provided in a pair capable of adjustment of an interval between them.

9. The work assembling device having the gripping device for an assembly part according to claim 7, wherein the claw is provided in a pair capable of adjustment of an interval between them.

* * * * *